Feb. 13, 1962 J. R. R. HARTER 3,020,722
SUBMARINE VEHICLE
Filed March 25, 1957 2 Sheets-Sheet 1
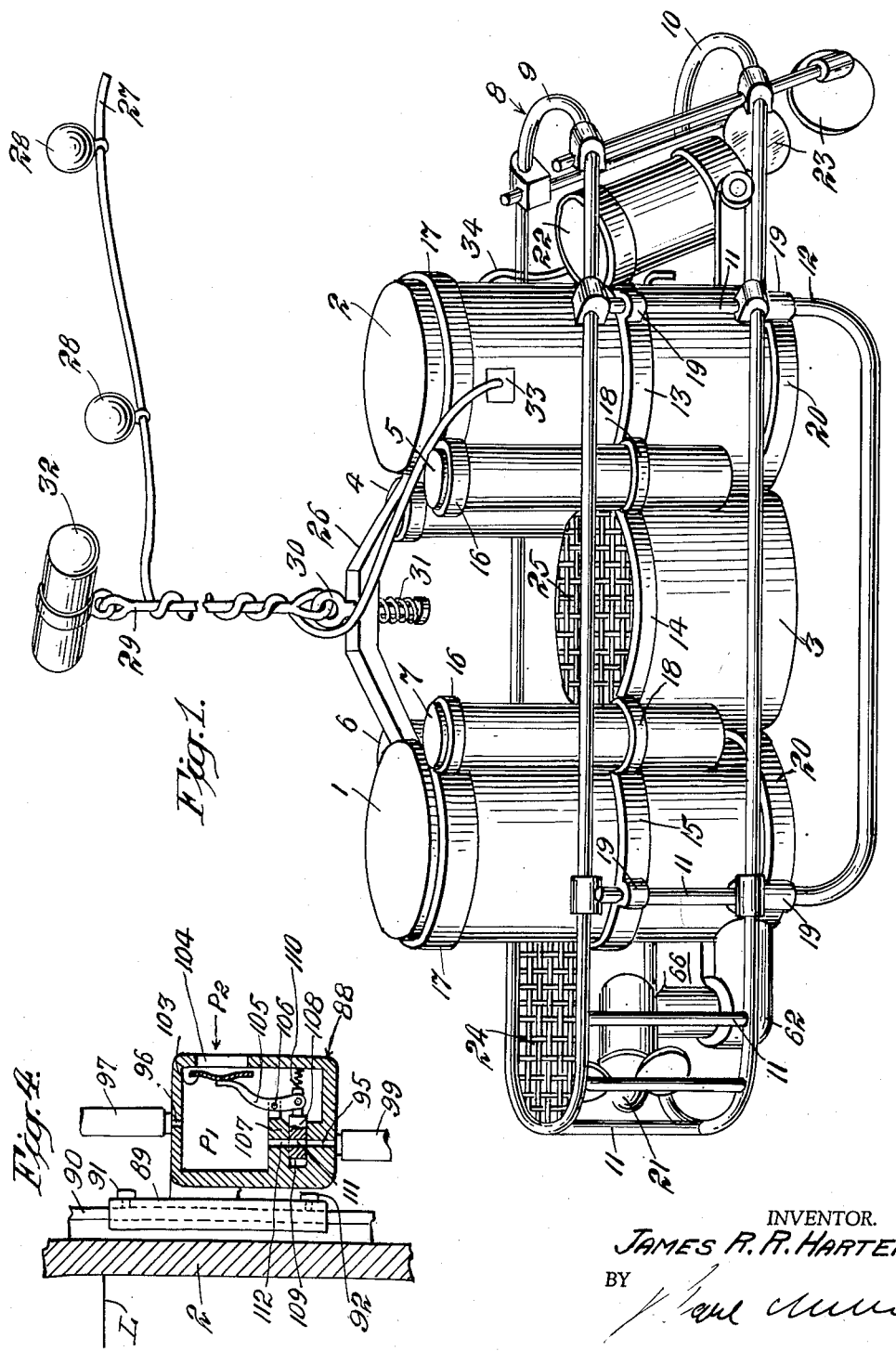
INVENTOR.
JAMES R. R. HARTER
BY
ATTORNEY

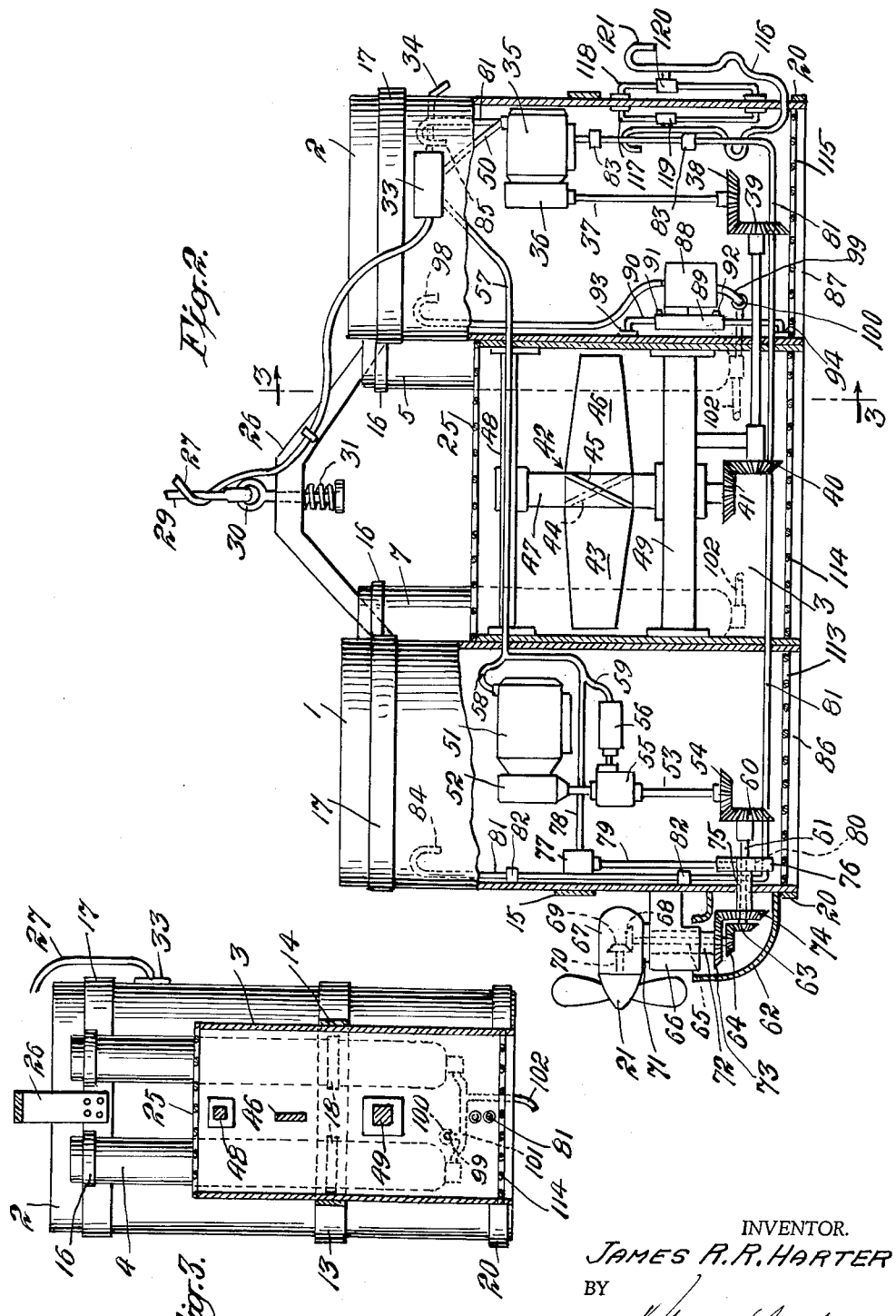

3,020,722
SUBMARINE VEHICLE
James R. R. Harter, 4953 Brandywine St. NW.,
Washington, D.C.
Filed Mar. 25, 1957, Ser. No. 648,364
6 Claims. (Cl. 61—69)

The present invention deals with a submarine vehicle and more particularly with a submarine vehicle of the remote control type.

This application is a continuation-in-part of application Serial No. 548,360, filed November 22, 1955, now abandoned.

Various types of submarine vehicles have been employed for submarine exploration, for use as underwater observation means, for use as underwater working chambers, and for other underwater purposes. Since the pressure exerted against bodies submerged to great depths is considerable, such vehicles as known have been provided with closed chambers having thick walls, which make the vehicles heavy and sluggish in response to drive means therefor. Also, the heavy weight of the closed chambers make it extremely difficult to control hovering of the vehicle at a desired underwater level since the heavy chambers are not easily controlled by a vertical drive means, e.g. a propeller.

Moreover, underwater vehicles of the open chamber type as known are unstable with respect to hovering at desired underwater levels in view of variable water displacement factors which tend to vary the buoyancy of the vehicle and as such affect the stability of the vehicle in hovering at the desired depth.

It is an object of this invention to provide a submarine vehicle which is adapted to travel both horizontally and vertically while submerged.

It is another object of this invention to provide a submarine vehicle which is easily controlled and has improved response to a drive means therefor.

It is a further object of this invention to provide a submarine vehicle of improved stability in hovering at a desired submerged level.

Other objects and advantages of the invention will become apparent from the description hereinafter following and the drawings forming a part hereof, in which:

FIGURE 1 is a perspective view of a submarine vehicle according to the invention and including auxiliary apparatus mounted thereon, FIGURE 2 illustrates a partly elevational and partly sectional view of the operating system of the submarine vehicle, FIGURE 3 illustrates a partly elevational and partly sectional view along line 3—3 of FIGURE 2, and FIGURE 4 illustrates an enlarged partly sectional and partly elevational view of an embodiment of the invention.

The invention relates to a submarine vehicle adapted for underwater travel both vertically and horizontally and which essentially comprises at least one and preferably a plurality of chambers having sufficient internal capacity to provide for positive buoyancy of the vehicle. The term "positive buoyancy" refers to a chamber capacity more than sufficient to displace the weight of the vehicle in water, whereby the vehicle will float and necessitates a motivating force to overcome the positive buoyancy in order to submerge the vehicle. More particularly the invention relates to a remote control type submarine vehicle having essentially a positive buoyancy in combination with automatically operable pressure sensitive means for balancing the internal pressure of the chambers against the water pressure exerted on the walls of the chamber or chambers, whereby the pressure sensitive means provides for constant positive buoyancy of the vehicle together with comparatively light weight of the vehicle so that the vehicle is readily responsive to a drive means at any desired submerged level.

Referring to FIGURE 1, the submarine vehicle comprises preferably a pair of laterally spaced chambers 1 and 2 with a housing 3 positioned therebetween and with compressed gas containers, 4, 5, 6 and 7 mounted on the chambers 1 and 2, for example, containers 4 and 5 mounted on chamber 1 and containers 6 and 7 mounted on chamber 2. The said chambers, containers and housing are mounted on an elongated carriage 8 substantially centrally thereof. The carriage frame comprises upper and lower rails 9 and 10, connected by means of upright ribs 11, and a pair of legs 12 depending from the lower rail 10 for supporting the carriage when at rest. The housing 3 is secured to the chambers 1 and 2, e.g. by means of bands 13, 14 and 15, the containers 4, 5, 6 and 7 are secured to the chambers 1 and 2 by means of upper container bands 16 connected to upper chamber bands 17 and with lower container bands 18 connected to the bands 13 and 15. The chambers 1 and 2 are secured to the carriage 8 by means of retainers 19 securing bands 13 and 15 and bands 20 to ribs 11. A propeller means 21 is mounted within one end of the carriage 8 and connected to the chamber 1. An observation means, e.g. camera 22, is mounted within the other end of the carriage and connected thereto by any suitable means. Lights 23 are mounted on the carriage 8, e.g. on rails 9 and 10, below the camera 22. For protection purposes, wire grid 24 is mounted on the upper rail 9 above the propeller means 21, and a wire grid 25 is secured on top of the housing 3.

The chambers 1 and 2 are bridged by means of a bridge arm 26 connecting the said chambers 1 and 2.

The vehicle and apparatus mounted thereon is remote controlled by means of an electric cable 27 leading to a surface craft (not shown). The cable, being negatively buoyant, is supported by a plurality of floats 28, which eliminates the need for additive driving thrust of a driving means. In order to prevent any entanglement of the cable with the vehicle, an upright rod 29 is secured to the bridge arm 26 by means of a link 30 connected to said rod, the link 30 being shock absorbent by means of a spring member 31 positioned on said link between an end of said link and the bottom surface of the bridge arm 26. The rod 29 is supported in vertical position by means of a float 32 connected thereto, and the cable 27 is wound about the rod 29 above the bridge arm 26 and leads to a junction member 33 secured to the chamber 2, and wherefrom electrical conduit 34 leads to the camera 22 and lights 23, and other conduits to the drive mechanism for the vehicle.

FIGURE 2 shows a partly elevational side view and partly cross-sectional view of the operating system of the vehicle as removed from the carriage 8. The operating system comprises in combination a drive system and an automatic pressure control system.

Referring to the drive system, a motor 35 is secured to the internal wall of chamber 2 and is connected through a reduction drive 36 positioned thereon to a vertical shaft 37 in the end of which is mounted a gear 38 which engages a gear 39 forming a screw gear drive. A horizontal shaft leads from the gear 39 through the walls of chamber 1 and housing 3 to gear 40 which engages gear 41 forming another screw gear drive in the housing 3.

A propeller 42, comprising propeller blades 43, 44, 45 and 46 mounted on a vertical shaft 47, is supported by upper mount 48 and lower mount 49 within the propeller housing 3. Upon energization of the motor 35, supplied with electrical energy by conductor 50 leading to the electrical junction 33, the propeller 42 is operated for vertical movement of the vehicle.

For horizontal movement, the chamber 1 is provided with a motor 51 mounted on the inner wall of said chamber. The motor 51 is connected to a reduction drive 52 positioned thereon. The reduction drive 52 is connected to a vertical shaft 53 having a gear 54 mounted on an end thereof. A variable speed transmission 55 is connected to the shaft 53 and a control member 56 is connected to said variable speed drive. A main conductor 57 is connected to the electrical junction 33, which branches as at 58 and 59 to energize the motor 51 and the control member 56. A gear 60 engages gear 54 to form a screw drive. A shaft 61 engages gear 60 and passes through the wall of chamber 1 into a gear housing 62 connected to the outer wall of chamber 1. Within the gear housing 62, a gear 63 is positioned on the end of shaft 61 and engages gear 64, forming a screw drive. A vertical shaft 65 leading from the gear 64 passes upwardly through conduit 66 to a gear housing 67. Within gear housing 67 is a gear 68 positioned on the end of shaft 65 and which engages a gear 69, forming a screw drive, the said gear 69 being secured to a shaft 70 connected to propeller 21.

Upon energization of the motor 51 and control member 56, the propeller is caused to move the vehicle horizontally at variable speeds.

However, in order to change horizontal direction, the propeller housing is mounted on a pivot 71 between the housing 67 and conduit 66. A rotatable sleeve member 72 is fixedly secured to the housing 67 and passes over and coaxially of shaft 65 through the conduit 66. A gear 73 is positioned on an end of said sleeve 72 within the housing 62, where it engages a gear 74, forming a screw gear, and connects with a rotatable sleeve 75 passing through the wall of chamber 1 coaxially of shaft 61. On an end of said sleeve 75, between the wall of chamber 1 and gear 60, is positioned a gear 76. A steering motor 77, electrically connected to junction 33 by means of branch conductor 78, is secured to the inner wall of chamber 1, said steering motor being connected to a vertical shaft 79 having a gear 80 connected to the end thereof and engaging gear 76, forming a worm drive.

It will now be apparent that while motor 51 and control member and their associated gearing will drive the vehicle horizontally at variable speeds, the steering motor 77 and its gearing will cause the propeller housing to rotate and enable a change of horizontal direction.

Regarding the automatic pressure control system, a common open tube member 81 is secured to the walls of chamber 1 by brackets 82, passes vertically downwardly in chamber 1, then horizontally outwardly of the wall of chamber 1, through the walls of housing 3 and chamber 2 and into chamber 2 and upwardly thereof where it is secured to the wall of chamber 2 by brackets 83. Advantageously, the ends of the tube 81 are bent downwardly as at 84 and 85.

It will be apparent that the open tube 81 operates to equalize the air pressure in chambers 1 and 2.

When the vehicle is submerged, by means of the propeller 42 operating to provide propulsion sufficient to overcome the positive buoyancy of the chambers 1 and 2, the water would ordinarily rise inside the chambers 1 and 2 through the open bottoms 86 and 87 thereof because of the increased pressure at the lower water levels, and the water level inside the chambers would ordinarily continue to rise and overcome the positive buoyancy of the chambers by compression of the air within the chambers and the consequent reduction of air volume.

In order to maintain the air volume within the chambers constant, and consequently a constant positive buoyancy, an automatic pressure sensitive means is provided and is preferably in the form of a valve member generally indicated as 88. The valve member 88 is vertically adjustable along the wall of chamber 2 and as such is secured to a movable sleeve 89 mounted on a vertical rod 90 by means of retainers 91 and 92, the rod 90 being secured to the wall of chamber 2 as at 93 and 94, with the rod proper being spaced from the said wall as particularly illustrated.

Referring to FIGURES 2, 3 and 4, the valve 88 is provided with an inlet 95 and outlet 96, said outlet being connected to a tube 97 passing upwardly into chamber 2 and having its upper end bent as at 98. The inlet 95 is connected to a tube 99 which passes outwardly of the chamber 2 through an aperture 100 and is connected to the source of pressurized gas, i.e. containers 4, 5, 6 and 7.

FIGURE 3 illustrates one manner of connecting the inlet tube 99 to gas containers 4 and 5 and shows the tube 99 connected to a tube 101 interconnecting containers 4 and 5, whereby both containers simultaneously provide pressurized gas to the chambers 1 and 2. The connection to containers 6 and 7 (not shown) are similar to that illustrated with respect to containers 4 and 5 and a tube 102, interconnects the containers 6 and 7 with containers 4 and 5 so that all four containers simultaneously provide pressurized gas to valve 88.

As a modification, chamber 1 may contain a valve identical to valve 88, in which case a pair of containers may supply chamber 1 and another pair may supply chamber 2. Where limited submersion is contemplated one or more gas containers may be closed by means of conventional valves supplied with the containers.

FIGURE 4 illustrates an operating mechanism for valve 88. When the vehicle submerges by means of the propulsion of propeller 42, the valve 88 is below water level L and the water pressure tends to compress the entrapped air or gas within the chambers 1 and 2. When the water pressure becomes greater than the entrapped air within the chambers, the water pressure $P_2$ outside the valve 88 is greater than the air pressure $P_1$ inside the valve and it will cause the plug or diaphragm 103 covering the port 104 to move inwardly. The diaphragm 103 is connected to an end of arm 105 which is pivoted intermediate the ends thereof as at pivot 106 which is mounted on block 107. The other end of the arm 105 is connected to a piston 108 slidably mounted in bore 109 in the block 107, said piston is spring loaded by means of spring 110 connected to an end of piston 108 and anchored to the wall of valve 88 internally thereof. The piston 108 is provided with a passage 111 formed therethrough and which communicates with inlet 95 and passage 112 through block 107 when the water pressure $P_2$ externally of valve 88 is greater than the pressure $P_1$ internally thereof. When the inlet 95 is in alignment with passages 111 and 112, the pressured gas from one or more cylinders 4, 5, 6 and 7, through conduit 99, enters the valve and passes into the chamber 2 through outlet 96 and conduit 97. Since the open conduit 81 is common to both chambers 1 and 2, it will be apparent that valve 88 serves both chambers with pressurized gas. When the gas pressure in chambers 1 and 2 equals the water pressure $P_2$, the diaphragm 103 closes port 104 and the water level inside chambers 1 and 2 is caused to remain constant.

It is therefore apparent that valve 88 operates automatically to maintain a constant volume of gas or air in the chambers and consequently stabilizes the buoyancy of the vehicle. For protective measures, a screen or grid 113, 114, and 115, cover the open bottoms of chamber 1, housing 3, and chamber 2 respectively.

When the vehicle is caused to rise, the air or gas pressure in chambers 1 and 2 would ordinarily force the water level outwardly of the chambers creating a larger air volume and making the positive buoyancy unstable. However, such a condition is precluded by means of an exhaust system comprising an open conduit 116 passing through the wall of chamber 2 with one end thereof positioned inside the chamber above the water level and the other end positioned outside of the chamber preferably at the water level internally of the chambers. The conduit 116 is adjustably mounted on rods 117 and 118 inside and outside of chamber respectively, by means of sleeves 119 and 120 adjustably secured to the rods. Consequently, as the vehicle rises, the gas or air pressure inside the chambers becomes greater than the water pressure and air or gas is expelled through the end 121 of conduit 116 at a rate consistent with the decrease in water pressure. It is apparent, therefore, that the gas or air volume in the chambers remains constant under varying water pressures and that the positive buoyancy of the vehicle is substantially stabilized at varying ambient water levels, and the combination of a drive system with an automatic pressure control system provides a remote control type submarine vehicle with improved response and stability especially for hovering at desired water levels.

While the invention is described with respect to specific illustrations it is intended that various modifications are contemplated within the scope of the appended claims.

What I claim is:

1. A submarine vehicle comprising in combination a carriage, at least one gas chamber having an open bottom, a source of pressurized gas and drive means mounted on said carriage, said gas chamber having sufficient gas capacity to displace more than its weight in water, conduit means interconnecting said source of pressurized gas and said gas chamber, said conduit including pressure sensitive valve means intermediate the ends thereof, said valve being responsive to a pressure difference between said chamber and ambient water pressure, the valve being located inside the chamber and in direct communication with the ambient water through said open bottom and an open exhaust conduit through the wall of said chamber the outer end of the exhaust conduit being positioned below the inner end, said exhaust conduit being operative when the pressure in said chamber exceeds the ambient water pressure, whereby the gas volume of the chamber remains constant under varying pressure.

2. A submarine vehicle according to claim 1, comprising a plurality of gas chambers, and a common gas conduit interconnecting said chambers.

3. A submarine vehicle according to claim 1, wherein said chamber is open at the bottom thereof.

4. A submarine vehicle according to claim 2, wherein said drive means includes propeller means for driving the vehicle vertically and propeller means for driving the vehicle horizontally.

5. A submarine vehicle according to claim 4, comprising motor means for driving said propellers, said motor means being contained in said chambers.

6. A submarine vehicle comprising in combination a carriage, at least one gas chamber having an open bottom, a source of pressurized gas and drive means mounted on said carriage, said gas chamber having sufficient gas capacity to displace more than its weight in water, conduit means interconnecting said source of pressurized gas and said gas chamber, said conduit including pressure sensitive valve means intermediate the ends thereof, said valve being responsive to a pressure difference between said chamber and ambient water pressure, the valve being located inside the chamber and in direct communication with the ambient water through said open bottom and an open exhaust conduit through the wall of said chamber the outer end of the exhaust conduit being positioned below the inner end, said exhaust conduit being operative when the pressure in said chamber exceeds the ambient water pressure, whereby the gas volume of the chamber remains constant under varying pressure, said vehicle being a remote control vehicle having electrical conductor means connected to said drive means.

References Cited in the file of this patent

UNITED STATES PATENTS

| | | |
|---|---|---|
| 820,372 | Spear et al. | May 8, 1906 |
| 896,361 | Cage | Aug. 18, 1908 |
| 952,452 | Leon | Mar. 22, 1910 |
| 1,240,180 | Arazoza | Sept. 18, 1917 |
| 2,060,670 | Hartman | Nov. 10, 1936 |
| 2,519,453 | Goodman | Aug. 22, 1950 |
| 2,784,559 | Kajmo | Mar. 12, 1957 |